United States Patent [19]

Schultz, Jr.

[11] 4,182,193
[45] Jan. 8, 1980

[54] PULLEY

[76] Inventor: Edward H. Schultz, Jr., 1055 Bluff Rd., Glencoe, Ill. 60022

[21] Appl. No.: 876,993

[22] Filed: Feb. 13, 1978

[51] Int. Cl.² .................... F16H 55/44; F16H 55/46
[52] U.S. Cl. .................... 74/230.8; 74/230.14; 403/359; 403/375
[58] Field of Search ............... 74/230.01, 230.3, 230.5, 74/230.8, 230.14, 243 R; 29/159 R, 159.3, 510; 403/359, 375

[56] References Cited

U.S. PATENT DOCUMENTS

| | | | |
|---|---|---|---|
| 1,196,937 | 9/1916 | Evans | 74/243 R |
| 1,266,579 | 5/1918 | Garcelon | 29/159 R |
| 2,188,953 | 2/1940 | Mitchell | 74/230.8 |
| 2,443,688 | 6/1948 | McFarland | 403/359 |
| 2,646,689 | 7/1953 | Maher | 74/230.8 |
| 2,932,207 | 4/1960 | Whitney | 403/359 |
| 3,069,918 | 12/1962 | Schultz, Jr. | 403/359 |
| 3,069,919 | 12/1962 | Schultz, Jr. | 74/230.8 |
| 3,094,881 | 6/1963 | Schultz, Jr. | 74/230.8 |
| 3,213,703 | 10/1965 | Fitzgerald | 74/243 R |
| 3,381,540 | 5/1968 | Schultz, Jr. | 74/203 |
| 3,722,310 | 3/1973 | Schultz, Jr. | 74/230.8 |
| 3,762,230 | 10/1973 | Steil et al. | 74/203.3 |
| 3,938,635 | 2/1976 | Davies et al. | 403/359 |
| 4,002,081 | 1/1977 | Schultz, Jr. | 74/230.8 |
| 4,037,486 | 7/1977 | Schultz, Jr. | 74/230.8 |
| 4,078,445 | 3/1978 | Kiser, Jr. | 74/243 R |

FOREIGN PATENT DOCUMENTS 935549 6/1948 France .................... 29/159 R

Primary Examiner—Samuel Scott
Assistant Examiner—William R. Henderson
Attorney, Agent, or Firm—Trexler, Wolters, Bushnell & Fosse, Ltd.

[57] ABSTRACT

A pulley comprises a hub and a pair of generally annular sheet metal members having central openings for receiving a portion of the hub and oppositely flared margins for defining a groove to accommodate a belt. The hub includes a shouder portion of sufficient axial length to extend through the openings of the sheet metal members. A leading end part of the shoulder portion is flared over upon insertion through the openings for grippingly engaging the first and second sheet metal members. A plurality of radially alternating lands and grooves in the hub axially trail the shoulder portion, and a radial array of alternating slots and projections in the first and second sheet metal member openings engage the lands and grooves. Alternatively, a generally annular welding plate is provided having a central opening including a plurality of inward projections for engaging the hub grooves, and a plurality of welding projections for weldable attachment to one of the sheet metal members.

10 Claims, 11 Drawing Figures

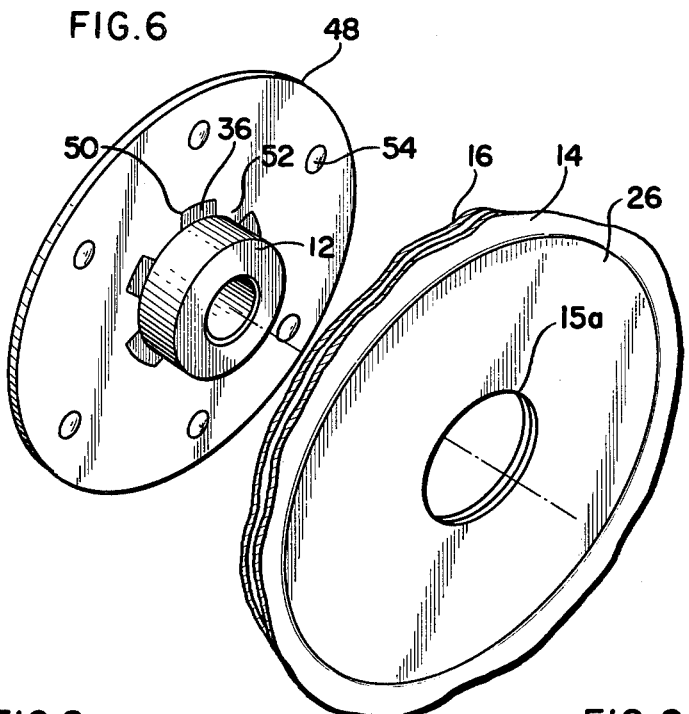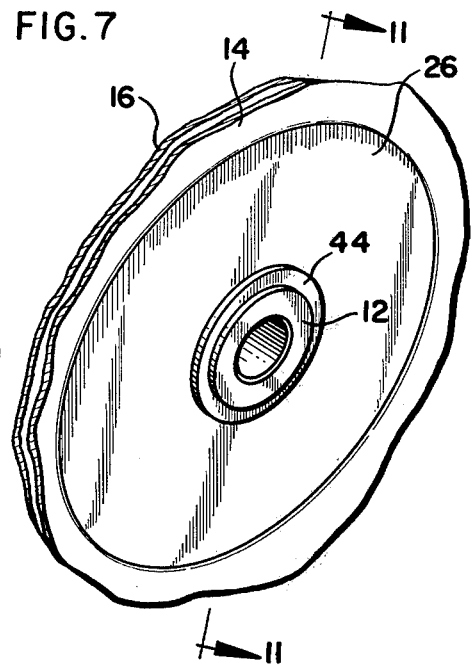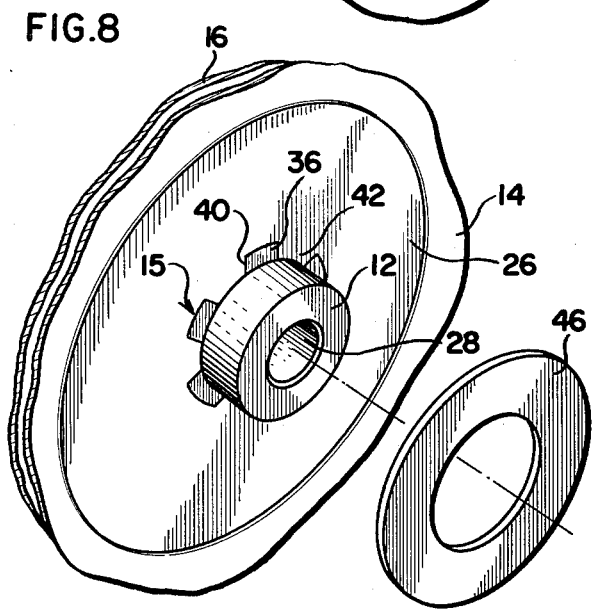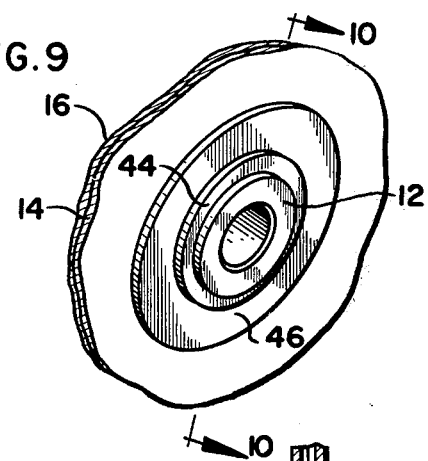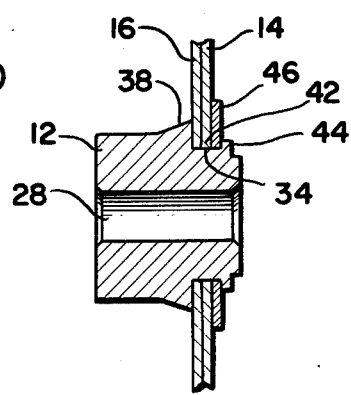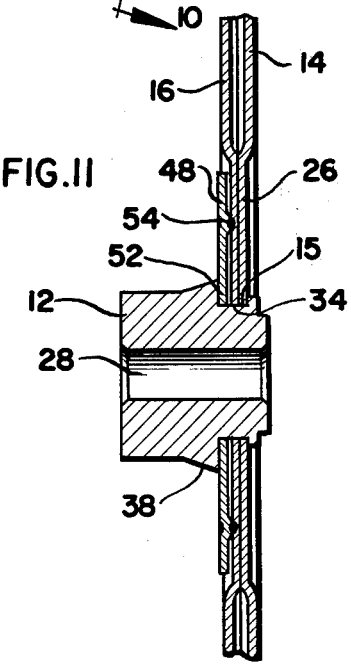

4,182,193

PULLEY

BACKGROUND OF THE INVENTION

This invention relates generally to pulleys or sheaves and more particularly concerns a pulley or sheave comprising relatively few parts which can be simply and inexpensively manufactured and assembled.

Pulleys or sheaves assembled from hubs and one or more sheet metal parts are disclosed in U.S. Pat. Nos. 3,069,919; 3,094,881; 3,381,540; 3,722,310; 4,002,081 and 4,037,486. These pulleys generally require a plurality of bending, forming, brazing and staking operations for assembling the parts.

Accordingly, it is an object of the present invention to provide a new and improved pulley comprising relatively few parts which are simpler and less expensive both in their manufacture and in the assembly thereof than prior art pulleys.

The foregoing, as well as other objects and advantages of this invention will become apparent upon consideration of the following detailed description and the accompanying drawings, wherein like reference numerals are used throughout to designate like elements and components.

BRIEF DESCRIPTION OF THE DRAWINGS

FIG. 6 is a partially exploded perspective view of the central portion of a second embodiment of a pulley of the present invention;

FIG. 7 is a perspective view of the embodiment of FIG. 6 in assembled form;

FIG. 8 is a partially exploded perspective view of a central portion of yet another embodiment of a pulley according to this invention;

FIG. 9 is a perspective view of the embodiment of FIG. 8 in its assembled form;

FIG. 10 is a sectional view taken substantially in the plane of line 10—10 of FIG. 9; and FIG. 11 is a sectional view taken substantially in the plane of line 11—11 of FIG. 7.

DETAILED DESCRIPTION

Figure 1:
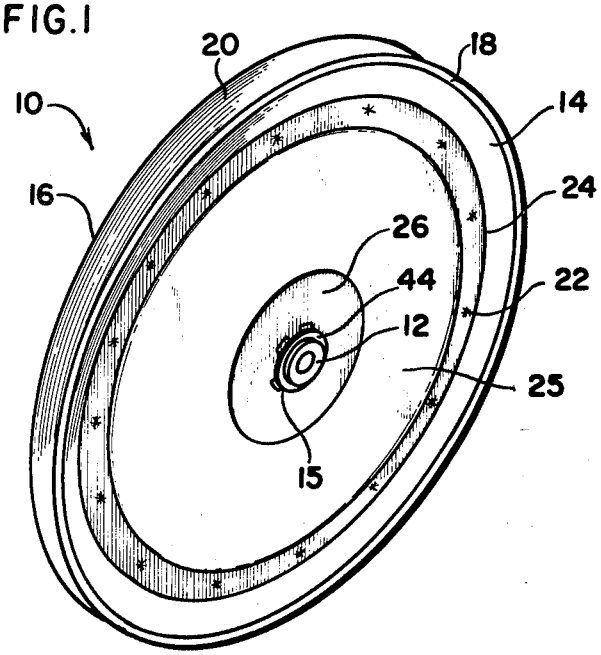
FIG. 1 is a perspective view of a pulley embodying the present invention.

Turning now specifically to the drawings, and in particular to FIGS 1 through 5 thereof, there is shown a pulley 10 embodying the present invention. More specifically, the pulley 10 comprises an assembly of component parts and can be considered to include a generally cylindrical axially elongate hub 12 and first and second sheet metal members 14 and 16. The sheet metal members 14 and 16 are generally annular in form and each include a central opening 15 for receiving a portion of the hub 12, and an outwardly flared margin 18, 20. The sheet metal members 14 and 16 are held in opposing assembled relation by a plurality of weldments 22 disposed generally around concentric annular abutting portions 24 thereof. The outwardly flared margins 18 and 20 are thus oppositely projected to define a groove for accommodating a belt therebetween.

The assembled sheet metal members 14 and 16, in the illustrated embodiment, include annular, axially outwardly extending or non-abutting web portions 25, radially inwardly of the annular abutting portions 24, and second annular abutting portions 26 radially inside of the portions 25, generally surrounding the central openings 15 thereof. It will be appreciated that the described configuration of the web portions 25 and of the portions 24 and 26 provides strength and rigidity to the assembled sheet metal members 14, 16. It will further be appreciated that the sheet metal members, 14 and 16, as described, may be simply and economically formed by conventional sheet metal forming operations. The members 14 and 16 are then easily assembled by being placed in opposing relation, the weldments 22 being applied thereto in a single, relatively simple operation.

Figure 2:
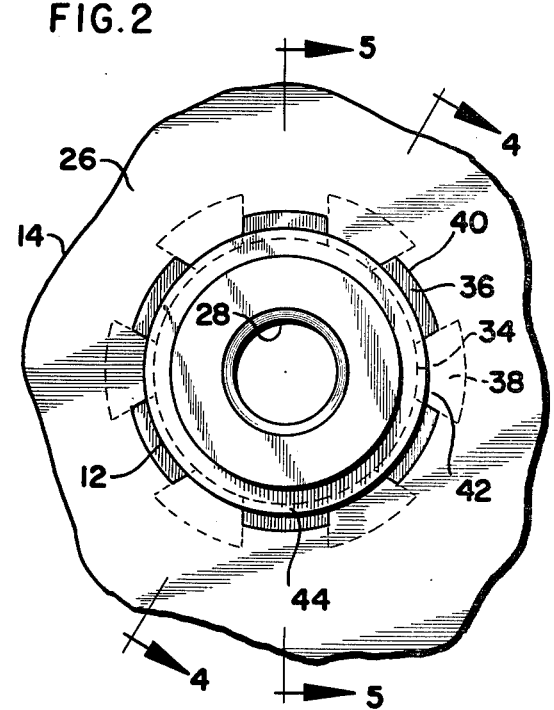
FIG. 2 is an enlarged elevational view of the central portion of the pulley of FIG. 1.
Figure 3:
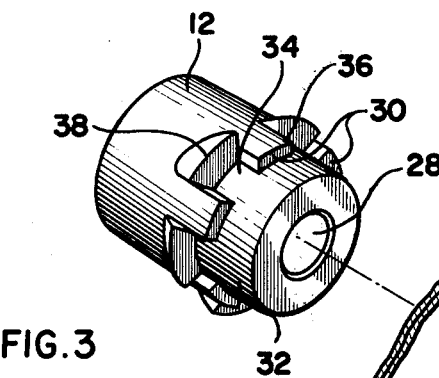
FIG. 3 is an exploded perspective view of the central portion of the pulley of FIGS. 1 and 2.

Referring now specifically to FIGS. 2 and 3, it will be seen that the hub 12 comprises a generally cylindrical, elongate hub having a central opening 28 for accommodating a shaft. As best seen in FIG. 3, a shoulder 30 is formed on the hub 12, defining a shoulder portion 32 of decreased diameter extending axially over a fractional part of the axial length of the hub 12. A plurality of axially extending upset grooves 34 are disposed radially about the hub 12 axially trailing the shoulder 30. The grooves 34 define a corresponding plurality of axially extending lands 36 therebetween, also disposed radially about the hub 12, and axially trailing the shoulder 30. The upset grooves 34 terminate in a corresponding plurality of radially outwardly extending tabs 38 about a common circumference of the hub 12. It will be appreciated that the foregoing lands 36 and grooves 34 and outwardly extending tabs 38 are relatively easily and inexpensively formed in a conventional upset groove-forming operation.

Figure 5:
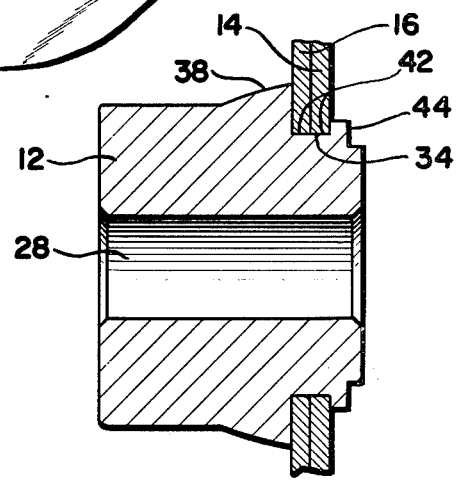
FIG. 5 is a sectional view of the pulley taken substantially in the plane of line 5—5 in FIG. 2.

Still with reference to FIGS. 2 and 3, it will be seen that the central openings 15 of the sheet metal members 14, 16, comprise generally circular openings including a radially castellated array of alternating slots and projections 40, 42. The slots and projections 40, 42 are complimentarily arranged for engaging the lands and grooves 36, 34, of the hub 12. In assembled relation, as best seen in FIGS. 1, 2 and 5, the shaft 12, upon insertion through the central opening 15 of the sheet metal members 14, 16, is flared over at a leading end part 44 thereof. In a preferred embodiment, the lands 36 of the hub 12 are also deformed somewhat upon engagement with the slots 40 of the sheet metal members 14 and 16, to form a press fit therewith.

Figure 4:
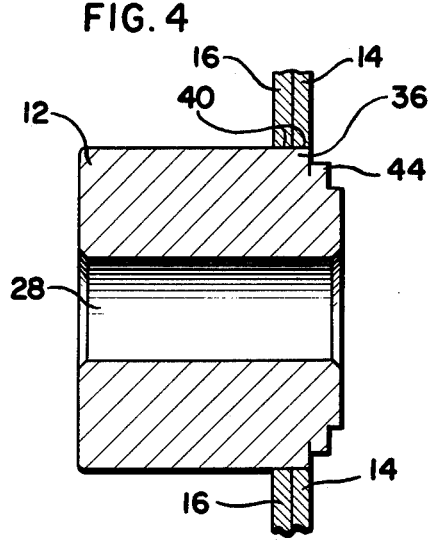
FIG. 4 is a sectional view of the pulley taken substantially in the plane of line 4—4 in FIG. 2.

Attention is now directed to FIGS. 4 and 5, from which it will be appreciated, together with the foregoing descriptions, that the hub 12 is held in radially assembled relation with the sheet metal members 14 and 16 through the cooperation of the lands and grooves 34, 36 with the slots and projections 40, 42. Moreover, it will be appreciated that this cooperation permits the transmission of a surprising amount of torque from the hub to the pulley perimeter for driving a belt or the like associated therewith. Similarly, the hub 12 is held in axially assembled relation with the sheet metal members 14, 16 by the cooperation of the flared over part 44 with the radially outwardly extending tabs 38. Thus, the lands and grooves 34, 36 of hub 12, the slots and projections 40, 42 of sheet metal members 14, 16. and the flared over part 44 and radially extending tabs 38 of the hub 12, together form holding means for holding the hub 12 and the sheet metal members 14, 16 in assembled relation.

Referring now to FIGS. 8 through 10, additional holding means comprising a generally annular ring or washer 46 is provided in an alternate embodiment of the pulley 10. In the embodiments of FIGS. 8 through 10, the sheet metal members 14, 16 and hub 12 are the same as described above. The annular washer 46 is interposed between the flared over part 44 of the hub 12 and the sheet metal members 14, 16, for providing additional strength and rigidity about the central opening 15.

Referring now to FIGS. 6, 7 and 11, another embodiment of holding means for holding the hub 12 and sheet metal members 14, 16 in assembled relation, is illustrated. The hub 12 and sheet metal members 14, 16, of FIGS. 6, 7, and 11 are substantially identical to those described above. However, the central openings 15a of the sheet metal members 14, 16 lack the slots and projections 40, 42 of the previous embodiments, being of a diameter generally equal to the diameter defined by the radially inner faces of the projections 42 of the previous embodiments. A retaining member comprises a generally annular welding plate 48, having a central opening 49 comprising a radially alternating array of slots and projections 50, 52 of substantially similar form to the slots and projections 40, 42 of the sheet metal members 14, 16 in the previous embodiments. Thus, in the present embodiment, the lands and grooves 36, 34 of the hub 12 engage the slots and projections 50, 52 of the welding plate 48. Preferably the leading faces of the lands 36 are deformed somewhat to form a press fit with the slots 50. The welding plate 48 includes a radial array of welding projections 54 on one face thereof, for weldable attachment to the annular abutting portion 26 of either of the sheet metal members 14 or 16. The diameter of the plate 48 is somewhat less than the outer diameter of the annular portion 26 whereby the plate 48 nests therein. As best seen in FIG. 7, the hub 12 is provided with a flared over portion 44 upon insertion through the central opening 15a, in similar fashion to the embodiment of FIGS. 1 through 5. It will be appreciated that the provision of the welding plate 48 provides, together with the flared over portion 44 of the hub 12, an alternate embodiment of holding means for holding the hub 12 and sheet metal members 14, 16 in assembled relation.

While specific embodiments of the present invention have been illustrated and described herein, it will be understood that the invention is not limited thereto. On the contrary, it is intended to cover all alternatives, modifications and equivalents may be included within the spirit and scope of the invention as defined by the appended claims.

The invention is claimed as follows:

1. A pulley comprising in combination: a generally cylindrical elongate hub including a reduced diameter portion at one end thereof and having thereon a peripheral array of radially extending shoulders defining spaced lands and grooves extending axially thereof toward the opposite end of the hub, and a plurality of peripherally spaced radial tabs at the inner ends of said grooves extending beyond said lands and spaced axially from said shoulders a predetermined axial distance toward the opposite end of the hub; composite annular sheet material members in side-by-side position presenting an outer belt receiving groove and inner opening means complementally shaped to interfit with the lands and grooves to prevent rotation thereof relative to the hub and disposed to substantially fill the space along said predetermined axial distance between the tabs and shoulders; and shoulder means adjacent the said one end of the hub engaging the adjacent sheet material member to cooperate with the tabs in securing the composite sheet material members against axial movement relative to the hub.

2. A pulley as claimed in claim 1, wherein the composite of sheet material members comprises first and second sheet material members each with outwardly flared outer margins forming the belt receiving groove.

3. A pulley as claimed in claim 2, wherein the said first and second sheet material members are each provided with a central opening defined by peripherally spaced slots and projections interfitting snugly with the lands and grooves, respectively, on said hub.

4. A pulley as claimed in claim 3, wherein the first and second sheet material members are welded together therearound inwardly of the belt receiving grooved portion.

5. A pulley as claimed in claim 4, wherein there is provided an annular washer interposed in clamped engagement between said shoulder means and the adjacent sheet material member for providing additional strength around the said central opening.

6. A pulley as claimed in claim 5, wherein the shoulder means comprises a flared over part of the hub in force fitted engagement with the adjacent sheet material member and shoulders.

7. A pulley as claimed in claim 1, wherein the composite of sheet material members comprises first and second sheet material members each with outer margins forming the belt receiving groove and with inner margins snugly fitting over the said lands, and wherein there is provided an annular retainer plate backed by said tabs and with an inner margin defined by slots and projections snugly interfitting with the lands and grooves, respectively, on said hub.

8. A pulley as claimed in claim 7, wherein the retainer plate is secured to the adjacent sheet material member.

9. A pulley as claimed in claim 8, wherein an inner annular portion of said adjacent sheet material member is inwardly offset from the adjacent outer portion thereof, and wherein the retainer plate is provided with an annular array of welding abutments for welded attachment at least to the said adjacent sheet material member in nested disposition relative to the inwardly offset portion of the adjacent sheet material member.

10. A pulley as claimed in claim 1, wherein the inner opening means of the composite of sheet material members includes peripherally spaced slots and projections interfitted with the lands and grooves, respectively, of the hub by a press fit and axially maintained by said tabs and said shoulder means.

* * * * *